US010396654B2

(12) United States Patent
Moallem et al.

(10) Patent No.: US 10,396,654 B2
(45) Date of Patent: Aug. 27, 2019

(54) START-UP CIRCUIT

(71) Applicant: SCHNEIDER ELECTRIC SOLAR INVERTERS USA, INC., Livermore, CA (US)

(72) Inventors: Ali Moallem, Coquitlam (CA); Zbigniew Wolanski, Burnaby (CA)

(73) Assignee: SCHNEIDER ELECTRIC SOLAR INVERTERS USA, INC., Livermore, CA (US)

(*) Notice: Subject to any disclaimer, the term of this patent is extended or adjusted under 35 U.S.C. 154(b) by 0 days.

(21) Appl. No.: 15/793,583

(22) Filed: Oct. 25, 2017

(65) Prior Publication Data
US 2019/0123636 A1 Apr. 25, 2019

(51) Int. Cl.
*H02M 1/36* (2007.01)
*H02M 7/48* (2007.01)
*H02S 40/32* (2014.01)
*H02J 3/38* (2006.01)
*H02M 1/00* (2006.01)

(52) U.S. Cl.
CPC ............... *H02M 1/36* (2013.01); *H02J 3/383* (2013.01); *H02M 7/48* (2013.01); *H02S 40/32* (2014.12); *H02M 2001/007* (2013.01)

(58) Field of Classification Search
CPC . H02M 1/36; H02M 3/24; H02M 1/32; G05F 1/607; G05F 1/613; G05F 1/618; G05F 1/652
See application file for complete search history.

(56) References Cited

U.S. PATENT DOCUMENTS

| 8,379,418 B2 | 2/2013 | Falk | |
| 9,337,720 B2* | 5/2016 | Jutras | H02M 1/36 |
| 2010/0259952 A1* | 10/2010 | Zhu | H02M 1/36 363/20 |
| 2015/0162833 A1 | 6/2015 | Phadke | |
| 2017/0187192 A1* | 6/2017 | Jeanty | H02M 7/44 |

FOREIGN PATENT DOCUMENTS

| DE | 3150176 A1 | 7/1983 |
| EP | 0810503 A1 | 12/1997 |
| WO | 2015099537 A1 | 7/2015 |
| WO | 2016015566 A1 | 2/2016 |

OTHER PUBLICATIONS

International Search Report and Written Opinion from corresponding PCT/US2018/057309 dated Jul. 5, 2019.
Linear Technology Corporation: "LTC3891 Datasheet—Low I Q, 60V Synchronous Step-Down Controller" (Jan. 1, 2010): 1-32 (Year: 2010).

* cited by examiner

*Primary Examiner* — Adolf D Berhane
*Assistant Examiner* — Afework S Demisse
(74) *Attorney, Agent, or Firm* — Lando & Anastasi, LLP

(57) ABSTRACT

According to one aspect, embodiments of the invention provide a start-up circuit for a power system, the start-up circuit comprising an input configured to be coupled to a power source and to receive input DC power from the renewable energy based power source, an output, a current regulator portion coupled to the input and configured to provide a regulated output current derived from the input DC power to the output, and a voltage regulator portion coupled to the current regulator portion and the output and configured to generate a regulated output voltage at the output derived from the input DC power.

18 Claims, 4 Drawing Sheets

START-UP CIRCUIT

BACKGROUND OF THE INVENTION

1. Field of Invention

At least some embodiments described herein relate generally to Power Supply (PS) systems for power converters.

2. Discussion of Related Art

Power Supply (PS) systems typically provide required power to different subsystems (e.g., a Digital Signal Processor (DSP), microcontroller, control and communication systems, gate driver, etc.) of a power converter. Low-Voltage-Ride-Through (LVRT) is a function which allows grid-connected power generators to supply power to the grid while the grid is experiencing low voltage events.

SUMMARY

At least one aspect of the invention is directed to a start-up circuit for a power system, the start-up circuit comprising an input configured to be coupled to a power source and to receive input DC power from the renewable energy based power source, an output, a current regulator portion coupled to the input and configured to provide a regulated output current derived from the input DC power to the output, and a voltage regulator portion coupled to the current regulator portion and the output and configured to generate a regulated output voltage at the output derived from the input DC power.

According to one embodiment, the input is further configured to receive the input DC power having a high voltage level. In another embodiment, the high voltage level is between 600-1500 VDC. In one embodiment, the input is further configured to receive the input DC power having an unregulated voltage level.

According to another embodiment, the current regulator portion comprises a first regulator configured to monitor the regulated output current and control a level of the regulated output current by adjusting a voltage drop of the current regulator portion. In one embodiment, the current regulator portion further comprises a first plurality of active devices coupled between the input and the output, and a first plurality of resistors coupled to the first plurality of active devices, wherein the first regulator is further configured to adjust the voltage drop of the current regulator portion by controlling a voltage drop of each of the first plurality of active devices. In another embodiment, the first plurality of active devices comprises a first plurality of transistors and the first regulator is further configured to operate each of the first plurality of transistors in a corresponding linear mode and generate, in combination with the first plurality of resistors, a desired gate voltage at each of the first plurality of transistors.

According to one embodiment, the voltage regulator portion comprises a second plurality of active devices, a second plurality of resistors coupled to the second plurality of active devices and forming a voltage divider with the second plurality of active devices, and a second regulator configured to monitor the regulated output voltage and control a level of the regulated output voltage by adjusting current drawn to the second plurality of active devices. In one embodiment, the second plurality of active devices comprises a second plurality of transistors and the second regulator is further configured to operate each of the second plurality of transistors in a corresponding linear mode and generate, in combination with the second plurality of resistors, a desired gate voltage at each of the second plurality of transistors. In another embodiment, each of the first regulator and the second regulator is one of a shunt regulator and a Zener diode based regulator.

Another aspect of the invention is directed to a method of starting-up a power device, the method comprising acts of receiving, at an input, input DC power from a power source coupled to the input, generating, with a current regulator portion coupled to the input, a regulated output current derived from the input DC power, generating, with a voltage regulator portion coupled to the current regulator portion, a regulated output voltage derived from the input DC power, powering a first converter coupled to the input with power derived from the regulated output current and the regulated output voltage, generating, with the converter, output DC power having a start-up voltage level, the output DC power derived from the input DC power, and starting the power device with the output DC power.

According to one embodiment, generating the regulated output current comprises acts of monitoring the regulated output current of the current regulator portion, and controlling, with the current regulator portion based on the act of monitoring, a level of the regulated output current by controlling a voltage drop of the current regulator portion. In one embodiment, the current regulator portion comprises a first plurality of active devices coupled to the input and a first plurality of resistors coupled to the first plurality of active devices, and controlling the level of the regulated output current comprises controlling a voltage drop of each of the first plurality of active devices.

According to another embodiment, the first plurality of active devices comprises a first plurality of transistors, and controlling the voltage drop of each the first plurality of active devices comprises operating each of the first plurality of transistors in linear mode, and generating a desired gate voltage at each of the first plurality of transistors. In one embodiment, the voltage regulator portion comprises a voltage divider including a second plurality of active devices and a second plurality of resistors, and generating the regulated output voltage comprises acts of monitoring the regulated output voltage of the voltage regulator portion, and controlling, with the voltage regulator portion, based on the act of monitoring the regulated output voltage, a level of the regulated output voltage by controlling current drawn to the second plurality of active devices.

According to one embodiment, the second plurality of active devices comprises a second plurality of transistors, and controlling the current drawn to each of the second plurality of active devices comprises operating each of the second plurality of transistors in linear mode, and generating a desired gate voltage at each of the second plurality of transistors. In one embodiment, powering the first converter with power derived from the regulated output current and the regulated output voltage comprises reducing, with a second converter, the regulated output voltage to a reduced level voltage, and powering, with the reduced level voltage, a controller of the first converter. In another embodiment, generating the output DC power derived from the input DC power comprises, upon powering up the controller of the first converter, reducing, with the first converter, a high voltage level of the input DC power to the start-up voltage level of the output DC power. In one embodiment, the method further comprises providing the output DC power from the first converter to an auxiliary power source, providing power having the reduced level voltage from the auxiliary power source to the controller of the first converter, and disconnecting, in response to providing power from the auxiliary power source to the controller, the current regulator portion from the input.

At least one aspect of the invention is directed to a power supply for a power system, the power supply comprising an input configured to be coupled to a DC power source, an output, a converter coupled to the input and the output, a controller coupled to the converter, and means for generating regulated power from at least one of unregulated power and high voltage power provided to the input by the DC power source and for powering the controller with the regulated power while the controller operates the converter to generate output DC power at the output derived from the at least one of unregulated power and high voltage power at the input.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
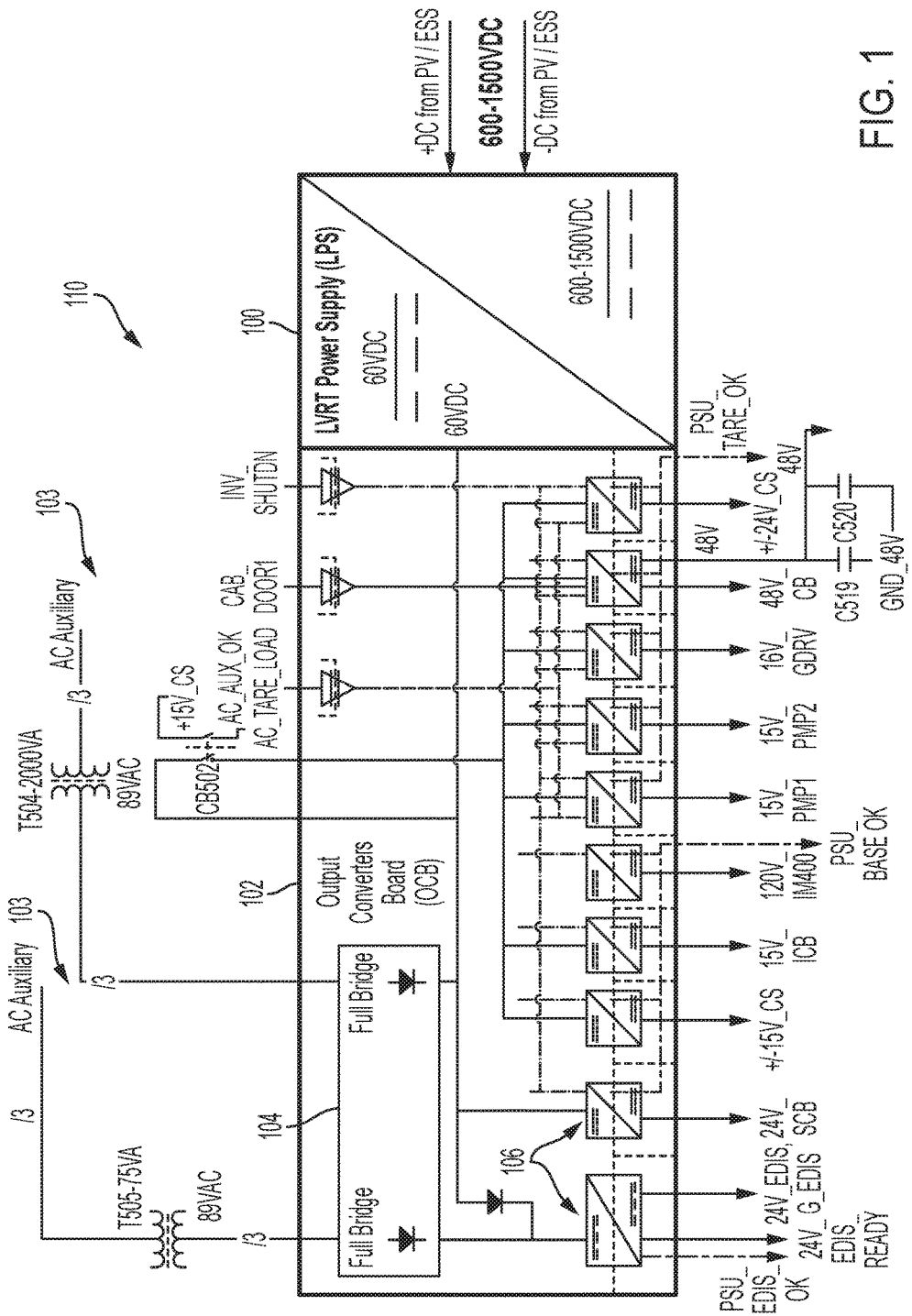
FIG. 1 is a block diagram of one embodiment of a power supply system according to aspects of the current invention.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Power converters typically require power for control systems and gate drivers upon start-up. Such start-up power can initially be provided by a startup system that generates the start-up power based on power received from an input source. Where the input source does not necessarily provide a properly regulated voltage level (e.g., where the voltage level is relatively high, unstable, and/or varies over a wide range), it may be difficult to provide the appropriate start-up power (having the appropriate start-up voltage level) to the control and driver circuits of the power converter.

For instance, renewable energy based power systems commonly employ a backup scheme that can support a power conversion system during various operational states of the utility grid (e.g., during a Low Voltage Ride Through (LVRT) condition of the grid). However, renewable energy based power generators (e.g. Photovoltaic (PV) panels) typically do not provide a properly regulated voltage, as discussed above, to the power converter which can lead to problems when the power converter is attempting to start up with power provided by the renewable energy based power generator.

One common technique for providing regulated startup voltage to a converter involves using Zener diodes to regulate a voltage to provide output power for a control circuit to start up. The Zener diodes are traditionally protected by using resistors to limit current in the Zener diodes. However, for high voltage applications (e.g., in a high voltage PV farm), the required resistors are relatively large and expensive, and continuously dissipate power. Another approach for providing a regulated startup voltage uses normally closed semiconductor switches. For example, a Junction Gate Field-Effect Transistor (J-FET) as a normally closed switch may be utilized. However, silicon based J-FET devices are typically not made for operation at higher voltages (e.g. above 60 VDC).

A switching converter, such as a flyback converter, may also be utilized as a start-up converter. However, for high voltage applications, the stress level is often too high for the switch to be realizable. Emitter-switched Bipolar Transistors (ESBT) and Hybrid Emitter-switched bipolar transistors have been utilized in high voltage applications; however, they are typically hard to drive and require special control circuitry, which adds complexity. Finally, in another approach, a pulse of energy is injected into the control circuit as the input voltage to the power supply increases. The circuit is designed so that the injected pulse of energy is enough to start the control circuitry and the energy pulse is injected as the change in the input voltage is sensed. However, if there is an insufficient rise in the input voltage, the circuit might not start.

A start up circuit is provided herein that can enable a power converter to start-up with power provided from a renewable energy based power generator (e.g., during a LVRT or black-out condition of the utility grid), without the need to utilize relatively expensive batteries or bulk capacitors. The startup circuit addresses the issues with the relatively high and wide-ranging voltage levels typically provided by a renewable energy based power generator as discussed above.

FIG. 1 is a power supply system 110 of a power converter including Low-Voltage-Ride-Through Power Supply (LPS) 100 and an Output Converter Board (OCB) 102. The LPS 100 is configured to be coupled to a renewable energy based generator (e.g., a photovoltaic based generator or some other type of solar, wind, geothermal, or hydro based power source) and the OCB 102. The OCB 102 is configured to be coupled to at least one AC power source (e.g., a utility grid) and at least one subsystem (e.g., a Digital Signal Processor (DSP), microcontroller, control and communication systems, gate driver, etc.) of a power converter. The OCB 102 includes a rectifier 104 and a plurality of DC-DC converters 106 coupled to the rectifier 104 and the LPS 100.

The LPS 100 receives DC power from the renewable energy based generator and is configured to generate a regulated voltage (e.g., 60 VDC) derived from the DC power received from the renewable energy based generator. The OCB 102 is configured to receive AC power from the at least one AC power source 103 and rectify the received AC power with the rectifier 104. Upon startup of the power converter, in response to the AC power received from the AC power source 103 being acceptable (i.e., at a sufficient level to power the subsystems to which the OCB 102 is coupled), the OCB 102 operates such that the plurality of DC-DC converters 106 are coupled to the rectifier 104 and configured to receive the rectified AC power (derived from the AC power received from the AC power source 103) from the rectifier 104. In response to the AC power received from the AC power source 103 being unacceptable (e.g., due to a blackout or brownout condition of a utility grid), the OCB 102 operates such that the plurality of DC-DC converters 106 are coupled to the LPS 100 and configured to receive the regulated voltage from the LPS 100.

Each one of the plurality of DC-DC converters 106 is configured to generate a regulated DC output voltage that is derived from either the rectified AC power received from the rectifier 104 or the DC voltage received from the LPS 100 and provide the regulated DC output voltage to a corresponding subsystem of the power converter to power up the corresponding subsystem. The regulated DC output voltage generated by each DC-DC converter 106 is at a level sufficient to power the corresponding subsystem of the power converter and each DC-DC converter 106 can generate a DC output voltage at a different level. At least two of the DC-DC converters 106 can also be configured to generate a DC output voltage at the same level. As described above, the subsystems of the power converter can reliably be turned on with power derived from either an AC source (e.g., utility grid) or a renewable energy based generator.

Figure 2:
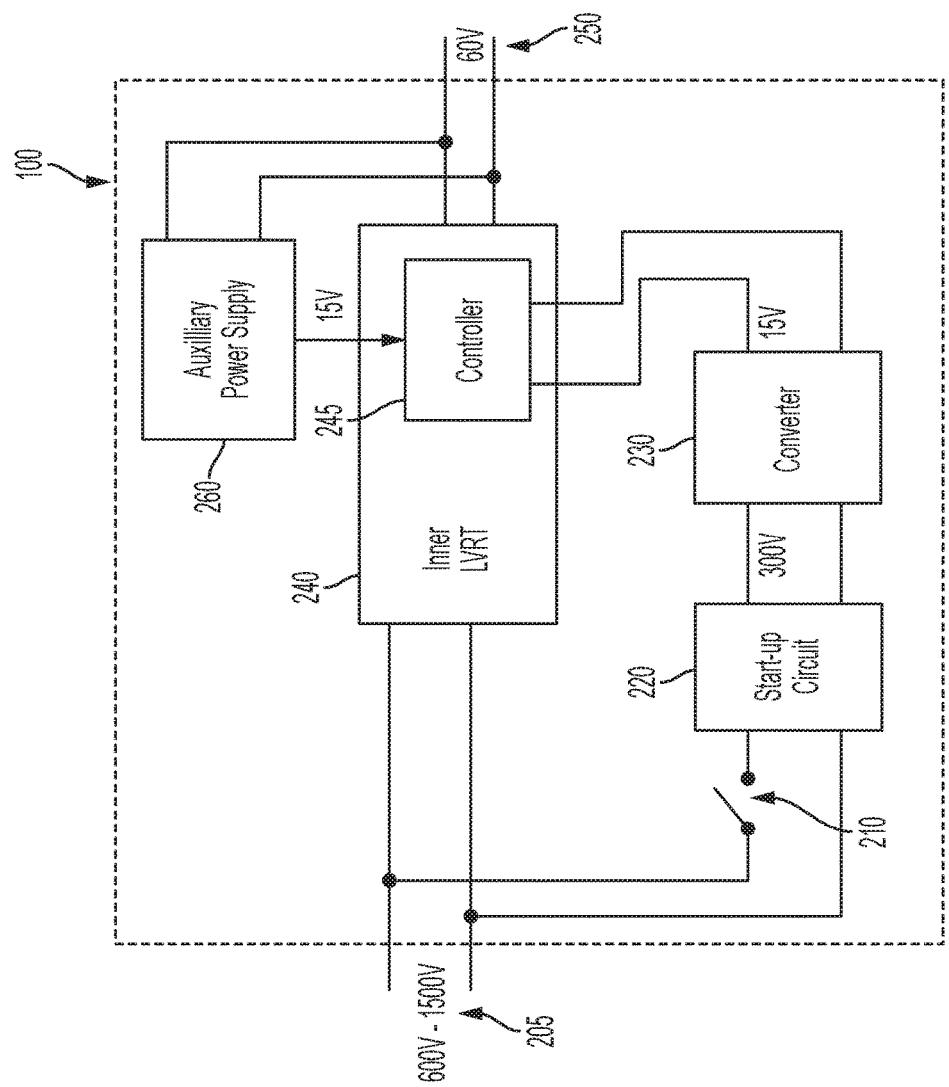
FIG. 2 is a block diagram of one embodiment of an LVRT Power Supply (LPS) according to aspects of the current invention.

FIG. 2 is a more detailed block diagram of the LPS 100. The LPS 100 includes an input 205, a switch 210, a start-up circuit 220, a start-up switching start-up switching converter 230, an LVRT converter 240, a controller 245, an output 250, and an auxiliary power supply 260. The input 205 is configured to be coupled to a renewable energy based generator and is coupled to the LVRT converter 240. The input 205 is also coupled to the start-up circuit 220 via the switch 210. The start-up circuit is coupled to the start-up switching converter 230. The start-up switching converter 230 is coupled to the controller 245. In one embodiment, the controller 245 is located within the LVRT converter 240; however, in at least one other embodiment, the controller 245 is located external the LVRT converter 240. The output 250 is coupled to the LVRT converter 240 and the auxiliary power supply 260. The auxiliary power supply 260 is also coupled to the controller 245.

The LPS 100 operates substantially as a DC-DC converter that is capable of being powered by a relatively high voltage (e.g., 600 VDC-1500 VDC) from a renewable energy based generator (e.g., a photovoltaic based generator) and providing a relatively low voltage (e.g., 60 VDC) to the plurality of DC-DC converters 106 to power subsystems of the power converter when AC grid power is unavailable/insufficient.

In response to the input AC power received from the AC source being acceptable, the subsystems of the power converter can be powered-on with power provided by the AC input source (e.g., as described above). In response to the input AC power received from the AC source being unacceptable at start-up of the power converter, the switch 210 is closed (e.g., automatically or by a signal from a controller) and DC power from the renewable energy based power source (e.g., a photovoltaic generator or another high voltage source) is provided to the start-up circuit 220 via the input 205.

The start-up circuit 220 generates a reduced and regulated output voltage (e.g., 300 VDC) derived from the DC power received from the renewable energy based power source and provides the reduced and regulated output voltage to the start-up switching converter 230. Operation of the start-up circuit 220 is discussed in greater detail below. The start-up switching converter 230 further reduces the output voltage to a level (e.g., 15 VDC) sufficient to power the controller 245.

Upon receiving the regulated output voltage (i.e., 15 VDC) from the start-up switching converter 230, the controller 245 starts up and powers on the LVRT converter 240. Upon being powered up, the LVRT converter 240 receives the relatively high voltage (e.g., 600 VDC-1500 VDV) from the renewable energy based generator and converts the relatively high voltage to a level (e.g., 60 VDC) sufficient to power up the auxiliary power supply 260. Upon receiving the voltage (e.g., 60 VDC) from the LVRT converter 240, the auxiliary power supply 260 begins operating and supplies the voltage (e.g., 15V) to power the controller 245.

After the controller 245 is powered with voltage from the auxiliary power supply 260, the switch 210 is opened and the start-up circuit 220 stops receiving the DC power from the renewable energy based generator. The regulated output voltage (e.g., 60 VDC) of the LVRT converter 240 is derived from the renewable energy based generator and can be provided downstream to the plurality of DC-DC converters 106, as discussed above, to power subsystems of the power converter.

According to at least one embodiment, the start-up circuit 220 includes a plurality of semiconductor devices that are operated in their linear mode. By using semiconductor devices operated in their linear mode, the need for switching gate driver circuits which typically require power to operate, even at start-up, can be eliminated. As such, smaller components with less power dissipation, relative to conventional resistors, can be utilized. More specifically, the start-up circuit 220 includes two parts—a current regulator portion to provide a regulated current source and a voltage regulator portion to provide a regulated voltage source. The current regulator and voltage regulator portions operate together to provide a regulated voltage (e.g., 300 VDC) and a fixed maximum power to the output of the start-up circuit 220 which is derived from the relatively high and unregulated voltage received from the renewable energy based generator.

Each of the current regulator and voltage regulator portions comprise a plurality of active devices, arranged in a chain and operated in their linear mode, such that controlling the current or voltage at the gate (e.g., control pin) of just one of the active devices in the chain provides control of the gate of each the other devices along the chain. In at least one embodiment, the number of devices in the chain determines the voltage drop.

Figure 3:
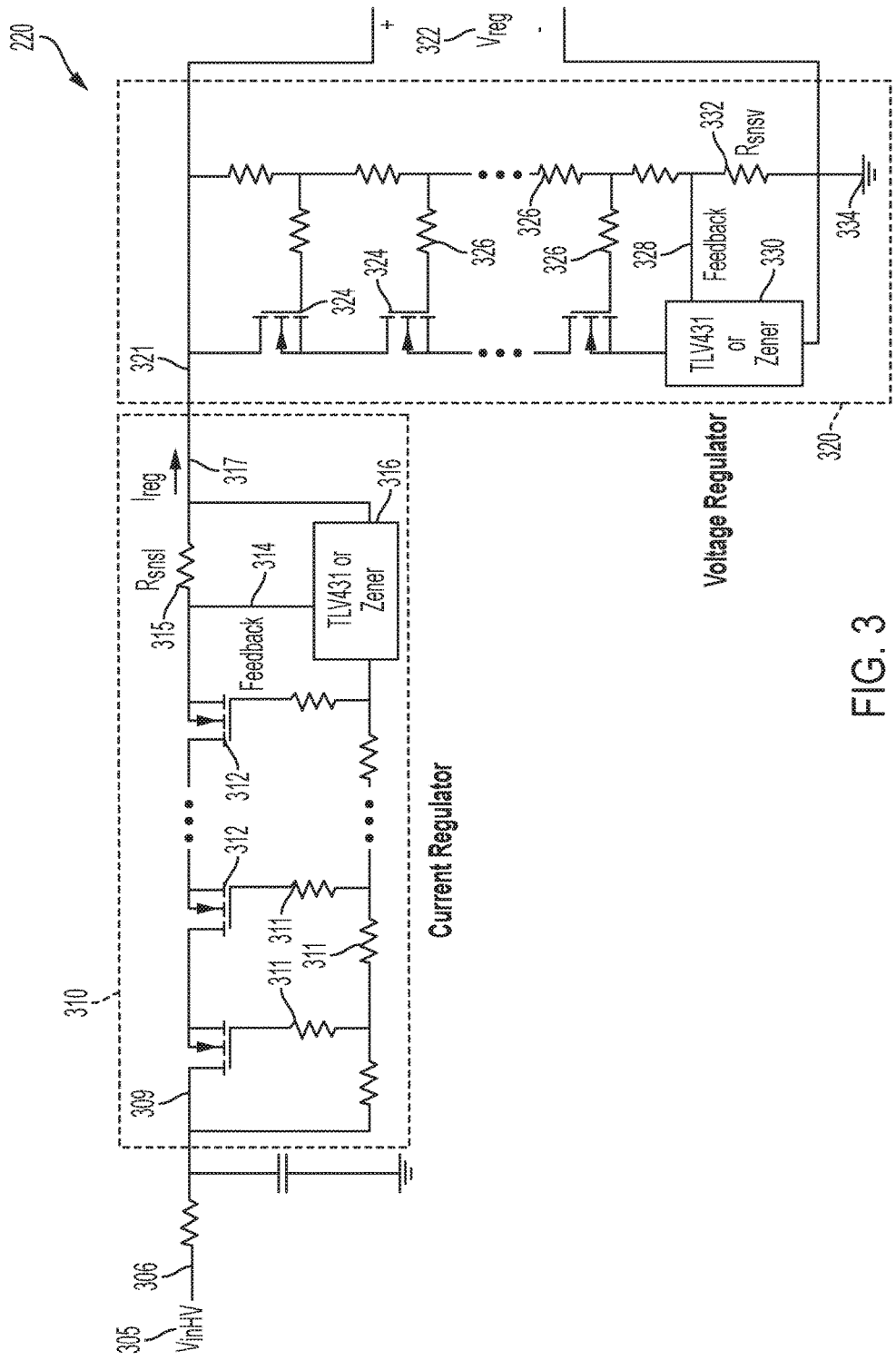
FIG. 3 is a schematic diagram of one embodiment of a start-up circuit according to aspects of the current invention.

FIG. 3 is a schematic diagram of one embodiment of the start-up circuit 220. The start-up circuit 220 shown in FIG. 3 includes an input 306, a current regulator portion 310, a voltage regulator portion 320, and an output 322. The current regulator portion 310 includes an input 306, an output 317, a plurality of Metal-Oxide-Semiconductor Field-Effect Transistors (MOSFET) 312, a plurality of resistors 311, a regulator 316, a feedback line 314, and a current sense resistor 315. The input 309 is coupled to the input 306 of the current regulator portion 310. The plurality of MOSFETs 312 is coupled in series between the input 309 and the output 317. The plurality of resistors 311 is coupled between the input 306 and the output 317 and is further coupled to the plurality of MOSFETs 312. A first terminal of the current sense resistor 315 is coupled to the plurality of MOSFETs 312 and a second terminal of the current sense resistor 315 is coupled to the output 317. The feedback line 314 is coupled between the first terminal of the resistor 315 and the regulator 316. In one embodiment, the regulator 316 is a Low-Voltage Adjustable Precision Shunt Regulator (TLV431) manufactured by Texas Instruments of Dallas, Tex. In another embodiment, the regulator 316 is a Zener diode based regulator. In other embodiments, any other type of regulator can be utilized.

The voltage regulator portion 320 includes an input 321, plurality of MOSFETs 324, a plurality of resistors 326, a regulator 330, a feedback line 328, and a voltage sense resistor 332. The input 321 is coupled to the output 322. The plurality of MOSFETs 324 is coupled between the input 321 and the output 322. The plurality of resistors 326 is coupled in series between the input 321 and ground 334 and is further coupled to the plurality of MOSFETs 324. A first terminal of the voltage sense resistor 332 is coupled to the plurality of resistors 326 and a second terminal of the voltage sense resistor 332 is coupled to ground 334. The feedback line 328 is coupled between the first terminal of the resistor 332 and the regulator 330. In one embodiment, the regulator 330 is a Low-Voltage Adjustable Precision Shunt Regulator (TLV431) manufactured by Texas Instruments of Dallas, Tex. In another embodiment, the regulator 330 is a Zener diode based regular. In other embodiments, any other type of regulator can be utilized.

As discussed above, upon start-up, the current regulator portion 310 of the start-up circuit 200 is coupled to the renewable energy based generator and receives DC power having a relatively high DC voltage level ($V_{InHv}$) 305 from the renewable energy based generator. Each of the plurality of MOSFET's 312 is operated in its linear mode (i.e., saturation region), resulting in a desired output current (Ireg) being provided to the output 317 of the current regulator portion 310. By operating the MOSFETs 312 in their respective linear modes, the drain current of each MOSFET 312 can be defined based on the voltage applied to the gate of each MOSFET 312. Accordingly, the regulator 316 monitors the voltage at the first terminal of the current sense resistor 315 via the feedback line 314 and adjusts the current (Ireg) of the current regulator portion 310 by controlling the voltage, in combination with the plurality of resistors 31, that is generated at the gate of each MOSFET 312. The resulting regulated output current (Ireg) is provided from the output 317 to the output 322 via the voltage regulator portion 320.

The MOSFETs 324 and the resistors 326 of the voltage regulator portion 320 form a voltage divider that defines the voltage level at the output 322. By operating the MOSFETs 324 in their respective linear modes (i.e., their saturation region), the drain current of each MOSFET 324 can be defined based on the voltage applied to the gate of each MOSFET 324. Accordingly, the regulator 330 monitors the voltage across the voltage sense resistor 332 via the feedback line 328 and adjusts the current drawn to the plurality of MOSFETs 324 from the input 321 which in turn regulates the voltage level (Vreg) at the output 322 by controlling the voltage, in combination with the plurality of resistors 326, that is generated at the gate of each MOSFET 324. The resulting regulated output voltage (Vreg) is provided from the output 322 to the start-up switching converter 230, as discussed above.

Figure 4:
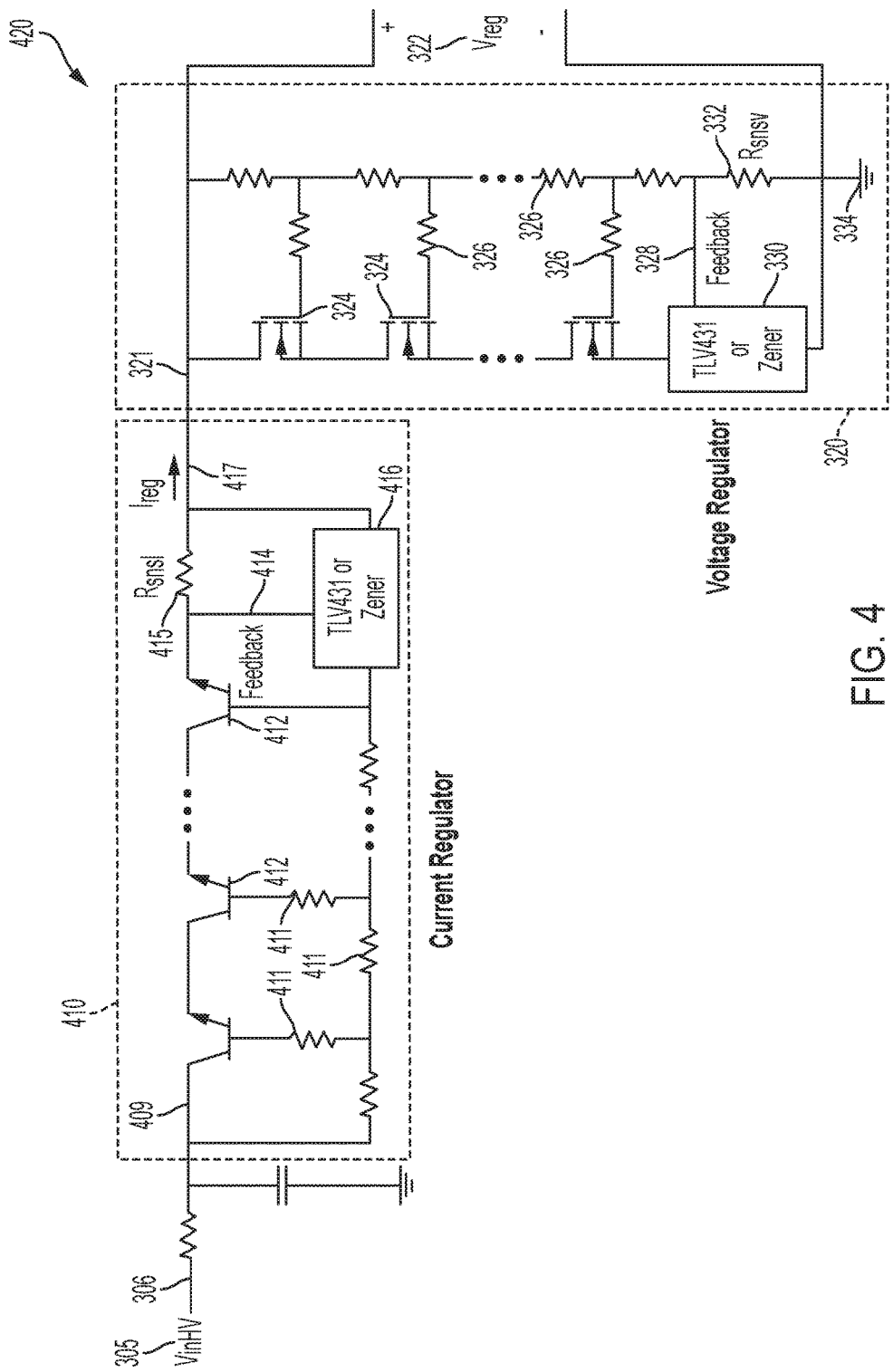
FIG. 4 is a schematic diagram of another embodiment of a start-up circuit according to aspects of the current invention.

FIG. 4 is a schematic diagram of another embodiment of a start-up circuit 420 that can be used in place of the start-up circuit 220 of FIG. 2. The start-up circuit 420 shown in FIG. 4 is substantially the same as the start-up circuit shown in FIG. 3, and similar components are labelled with the same reference numbers. Start-up circuit 420 differs from start-up circuit 220, in that the active devices of the current regulator portion 410, previously shown as MOSFETs in FIG. 3, are replaced with Bipolar Junction Transistors (BJT) 412. With the BJTs operated in their linear mode (i.e., in their active region), the current regulator portion 410 operates substantially the same as the current regulator portion 310 shown in FIG. 3, and generates a regulated output current (Ireg) and a regulated output voltage (Vreg) that are provided to the start-up switching converter 230.

As described above, the start-up circuits in accordance with embodiments discussed herein can utilize MOSFETs and BJTs; however, in other embodiments, a start-up circuit can utilize any other type of active devices in either the current regulator portion or the voltage regulator portion.

As also described above, the start-up circuit is utilized to start up a power converter with DC power from a renewable energy based generator; however, in other embodiments, the start-up circuit can be utilized to start up a power converter with power from any other type of renewable energy based power source or any other source of power having a relatively high voltage level. In addition, while the start-up circuit is described as providing start-up power to a power converter, in other embodiments, the start-up circuit can be utilized to start up any other type of device (e.g., an Uninterruptible Power Supply (UPS) or electrical drive) from a high and/or variable input voltage.

As discussed above, a start up circuit is provided that can enable a power converter to start-up with a relatively high and/or variable voltage provided from a renewable energy based power generator (e.g., during a LVRT or black-out condition of the utility grid), without the need to utilize relatively expensive batteries or bulk capacitors. The startup circuit addresses the issues with the relatively high and wide-ranging output voltage levels typically provided by a renewable energy based power generator as discussed above. In addition, by utilizing active devices operating in their linear mode, for example instead of relatively large and expensive resistors, smaller devices can be utilized and the power loss of the start-up circuit can be reduced.

The invention claimed is:

1. A start-up circuit for a power system, the start-up circuit comprising:
an input configured to be coupled to a power source and to receive input DC power from the renewable energy based power source;
an output;
a current regulator portion coupled to the input and configured to provide a regulated output current derived from the input DC power to the output; and a voltage regulator portion coupled to the current regulator portion and the output and configured to generate a regulated output voltage at the output derived from the input DC power wherein the current regulator portion comprises a first regulator configured to monitor the regulated output current and control a level of the regulated output current by adjusting a voltage drop of the current regulator portion.

2. The start-up circuit of claim 1, wherein the input is further configured to receive the input DC power having a high voltage level.

3. The start-up circuit of claim 2, wherein the high voltage level is between 600-1500 VDC.

4. The start-up circuit of claim 1, wherein the input is further configured to receive the input DC power having an unregulated voltage level.

5. The start-up circuit of claim 1, wherein the current regulator portion further comprises:
   a first plurality of active devices coupled between the input and the output; and
   a first plurality of resistors coupled to the first plurality of active devices,
   wherein the first regulator is further configured to adjust the voltage drop of the current regulator portion by controlling a voltage drop of each of the first plurality of active devices.

6. The start-up circuit of claim 5, wherein the first plurality of active devices comprises a first plurality of transistors and the first regulator is further configured to operate each of the first plurality of transistors in a corresponding linear mode and generate, in combination with the first plurality of resistors, a desired gate voltage at each of the first plurality of transistors.

7. The start-up circuit of claim 6, wherein the voltage regulator portion comprises:
   a second plurality of active devices;
   a second plurality of resistors coupled to the second plurality of active devices and forming a voltage divider with the second plurality of active devices; and
   a second regulator configured to monitor the regulated output voltage and control a level of the regulated output voltage by adjusting current drawn to the second plurality of active devices.

8. The start-up circuit of claim 7, wherein the second plurality of active devices comprises a second plurality of transistors and the second regulator is further configured to operate each of the second plurality of transistors in a corresponding linear mode and generate, in combination with the second plurality of resistors, a desired gate voltage at each of the second plurality of transistors.

9. The start-up circuit of claim 8, wherein each of the first regulator and the second regulator is one of a shunt regulator and a Zener diode based regulator.

10. A method of starting-up a power device, the method comprising acts of:
   receiving, at an input, input DC power from a power source coupled to the input;
   generating, with a current regulator portion coupled to the input, a regulated output current derived from the input DC power;
   generating, with a voltage regulator portion coupled to the current regulator portion, a regulated output voltage derived from the input DC power;
   powering a first converter coupled to the input with power derived from the regulated output current and the regulated output voltage;
   generating, with the converter, output DC power having a start-up voltage level, the output DC power derived from the input DC power; and
   starting the power device with the output DC power,
   wherein generating the regulated output current comprises acts of:
      monitoring the regulated output current of the current regulator portion; and
      controlling, with the current regulator portion based on the act of monitoring, a level of the regulated output current by controlling a voltage drop of the current regulator portion.

11. The method of claim 10, wherein the current regulator portion comprises a first plurality of active devices coupled to the input and a first plurality of resistors coupled to the first plurality of active devices, and wherein controlling the level of the regulated output current comprises controlling a voltage drop of each of the first plurality of active devices.

12. The method of claim 11, wherein the first plurality of active devices comprises a first plurality of transistors, and wherein controlling the voltage drop of each the first plurality of active devices comprises:
   operating each of the first plurality of transistors in linear mode; and
   generating a desired gate voltage at each of the first plurality of transistors.

13. The method of claim 12, wherein the voltage regulator portion comprises a voltage divider including a second plurality of active devices and a second plurality of resistors, and wherein generating the regulated output voltage comprises acts of:
   monitoring the regulated output voltage of the voltage regulator portion; and
   controlling, with the voltage regulator portion, based on the act of monitoring the regulated output voltage, a level of the regulated output voltage by controlling current drawn to the second plurality of active devices.

14. The method of claim 13, wherein the second plurality of active devices comprises a second plurality of transistors, and wherein controlling the current drawn to each of the second plurality of active devices comprises:
   operating each of the second plurality of transistors in linear mode; and
   generating a desired gate voltage at each of the second plurality of transistors.

15. The method of claim 14, wherein powering the first converter with power derived from the regulated output current and the regulated output voltage comprises:
   reducing, with a second converter, the regulated output voltage to a reduced level voltage; and
   powering, with the reduced level voltage, a controller of the first converter.

16. The method of claim 15, wherein generating the output DC power derived from the input DC power comprises, upon powering up the controller of the first converter, reducing, with the first converter, a high voltage level of the input DC power to the start-up voltage level of the output DC power.

17. The method of claim 16, further comprising:
   providing the output DC power from the first converter to an auxiliary power source;
   providing power having the reduced level voltage from the auxiliary power source to the controller of the first converter; and
   disconnecting, in response to providing power from the auxiliary power source to the controller, the current regulator portion from the input.

18. A power supply for a power system, the power supply comprising:
- an input configured to be coupled to a DC power source and to receive input DC power from the DC power source;
- an output;
- a converter coupled to the input and the output;
- a controller coupled to the converter; and
- means for generating regulated power from at least one of unregulated power and high voltage power provided to the input by the DC power source and for powering the controller with the regulated power while the controller operates the converter to generate output DC power at the output derived from the at least one of unregulated power and high voltage power at the input,
- wherein the means for generating the regulated power includes means for generating regulated output current derived from the input DC power, for monitoring the regulated output current, for controlling a level of the regulated output current by adjusting a voltage drop of the means for generating regulated output current, for generating regulated output voltage derived from the input DC power, and for providing start-up power, derived from the regulated output current and the regulated output voltage, to the controller.

* * * * *